(12) United States Patent
Raffaele

(10) Patent No.: US 9,402,351 B2
(45) Date of Patent: Aug. 2, 2016

(54) DEVICE FOR USE IN HORTICULTURAL CONTAINERS

(71) Applicant: Joseph A. Raffaele, Norton, MA (US)

(72) Inventor: Joseph A. Raffaele, Norton, MA (US)

(*) Notice: Subject to any disclaimer, the term of this patent is extended or adjusted under 35 U.S.C. 154(b) by 169 days.

(21) Appl. No.: 13/947,437

(22) Filed: Jul. 22, 2013

(65) Prior Publication Data

US 2014/0020293 A1    Jan. 23, 2014

Related U.S. Application Data

(60) Provisional application No. 61/674,626, filed on Jul. 23, 2012.

(51) Int. Cl.
*A01G 9/02* (2006.01)
*A01G 27/06* (2006.01)

(52) U.S. Cl.
CPC . *A01G 9/02* (2013.01); *A01G 27/06* (2013.01)

(58) Field of Classification Search
CPC ..... A01G 9/02; A01G 27/02; B65D 5/48038; B65D 25/04
USPC ........ 47/66.1, 79, 81; 108/101; 220/529, 532, 220/533, 552, 625, 626, 627, 630
See application file for complete search history.

(56) References Cited

U.S. PATENT DOCUMENTS

| | | | | |
|---|---|---|---|---|
| 1,912,505 A * | 6/1933 | Turner | ........... | B65D 25/04 220/552 |
| 2,638,716 A * | 5/1953 | Luipersbek | ........... | 47/79 |
| 2,903,127 A * | 9/1959 | Dorman | ........... | B65D 25/04 206/338 |
| 4,023,305 A * | 5/1977 | Harschel | ........... | A01G 9/02 137/150 |
| 4,151,680 A * | 5/1979 | Sena | ........... | 47/39 |
| 4,324,070 A * | 4/1982 | Swisher | ........... | 47/81 |
| 4,860,491 A * | 8/1989 | Panuski | ........... | 47/65.6 |
| 4,962,613 A * | 10/1990 | Nalbandian | ........... | 47/79 |
| 5,155,934 A * | 10/1992 | Leider | ........... | 47/86 |
| 5,644,868 A * | 7/1997 | Lui | ........... | 47/81 |
| 6,094,862 A * | 8/2000 | Fuchigami | ........... | 47/81 |
| 6,131,334 A * | 10/2000 | Fan | ........... | 47/81 |
| 8,381,440 B1 * | 2/2013 | Jabs | ........... | A01G 13/0281 47/29.5 |
| 2005/0050797 A1* | 3/2005 | Maniscalco et al. | ........... | 47/65.6 |

* cited by examiner

*Primary Examiner* — David Parsley
*Assistant Examiner* — Danielle Clerkley
(74) *Attorney, Agent, or Firm* — Lando & Anastasi, LLP

(57) ABSTRACT

Aspects and embodiments of the present invention relate to devices, methods, and kits for use in horticultural containers. In accordance with some embodiments, a horticultural device comprising a base and a supporting plate may advantageously reduce the amount of soil required for potting. Aspects and embodiments of the present invention may facilitate potting and may reduce plant maintenance.

6 Claims, 13 Drawing Sheets

DEVICE FOR USE IN HORTICULTURAL CONTAINERS

CROSS-REFERENCE TO RELATED APPLICATIONS

This application claims the benefit under 35 U.S.C. §119 (e) of U.S. Provisional Patent Application No. 61/674,626, filed on Jul. 23, 2012, titled, "DEVICE FOR USE IN HORTICULTURAL CONTAINERS," which is incorporated herein by reference in its entirety for all purposes.

BACKGROUND

Aspects and embodiments of the present invention relate generally to horticulture, and more specifically, to devices, methods, and kits used in horticultural containers.

SUMMARY

Aspects and embodiments of the present invention relate to devices, methods, and kits for use in horticultural containers. Aspects and embodiments may advantageously be used in the potting of plants in a horticultural container by, for example, reducing the amount of soil required for potting a plant in a horticultural container and may reduce the amount of maintenance required to sustain plant life.

In accordance with one aspect of the present invention, there is provided a horticultural device for use within a horticultural container having a floor and a wall, comprising a base for contacting the floor of the horticultural container and a supporting plate constructed and adapted to abut the wall of the horticultural container and to rest upon said base.

In accordance with some embodiments, the shape or size of the supporting plate may be modified to facilitate use of the device in horticultural containers of varying geometries and sizes.

In accordance with some embodiments, the horticultural supporting plate comprises at least one reinforcement undulation.

In accordance with some embodiments, the horticultural supporting plate comprises a plurality of reinforcement undulations positioned concentrically about the perimeter of the supporting plate.

In accordance with some embodiments, the plurality of reinforcement undulations facilitate adjustment of the supporting plate.

In accordance with some embodiments, at least one of the plurality of reinforcement undulations comprises a reinforcement ridge.

In accordance with some embodiments, at least one of the plurality of reinforcement undulations comprises a reinforcement groove.

In accordance with some embodiments, the horticultural supporting plate further comprises a plurality of reinforcement spokes that extend radially from the center of the horticultural supporting plate.

In accordance with some embodiments, the horticultural supporting plate further comprises a reinforcement hub positioned about the center of the horticultural supporting plate and coupled to the reinforcement spokes.

In accordance with some embodiments, the base of the horticultural device comprises at least two interlocking leg members.

In accordance with some embodiments, the at least two interlocking leg members comprise a plurality of reinforcement ribs.

In accordance with some embodiments, the shape or size of an interlocking leg member may be modified to facilitate use of the device in horticultural containers of varying geometries and sizes.

In accordance with some embodiments, the plurality of reinforcement ribs facilitate adjustment of the base.

In accordance with some embodiments, the at least two interlocking leg members comprise a plurality of reinforcement feet.

In accordance with another aspect of the present invention, a method of facilitating horticultural potting is provided comprising supplying a horticultural device comprising a supporting plate and a base comprising at least two leg members, instructing assembly of the horticultural device by interlocking the at least two leg members to form a base and coupling the base perpendicularly to the supporting plate, instructing placement of the horticultural device in a horticultural container to define a space within the horticultural container above the supporting plate, and providing instructions to fill the defined space within the horticultural container above the supporting plate with a potting medium.

In accordance with some embodiments, the method further comprises instructing the adjustment of the horticultural device to enable use in horticultural containers of varying geometries.

In accordance with another aspect of the present invention, a kit for horticultural containers is provided comprising a horticultural device configured to define an upper space and a lower space in a horticultural container, the device having a supporting plate including an inlet, and a base coupled to the support, a feed tubing having an external cross sectional area less than a cross-sectional area of the inlet, and a capillary mat configured to cover at least a portion of an upper surface of the supporting plate and further configured to extend into the lower space of the horticultural container defined by the horticultural device.

In accordance with some embodiments, the feed tubing comprises a float configured to indicate the amount of water contained in the space defined below the horticultural supporting plate.

In accordance with some embodiments, the kit further comprises an escape tube.

In accordance with some embodiments, the kit further comprises a self-adhesive lining.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures and description. In the figures, each identical or nearly identical component that is illustrated in various figures is represented by a like numeral. For purposes of clarity, not every component may be labeled in every figure. In the figures:

DETAILED DESCRIPTION

Figure 1:
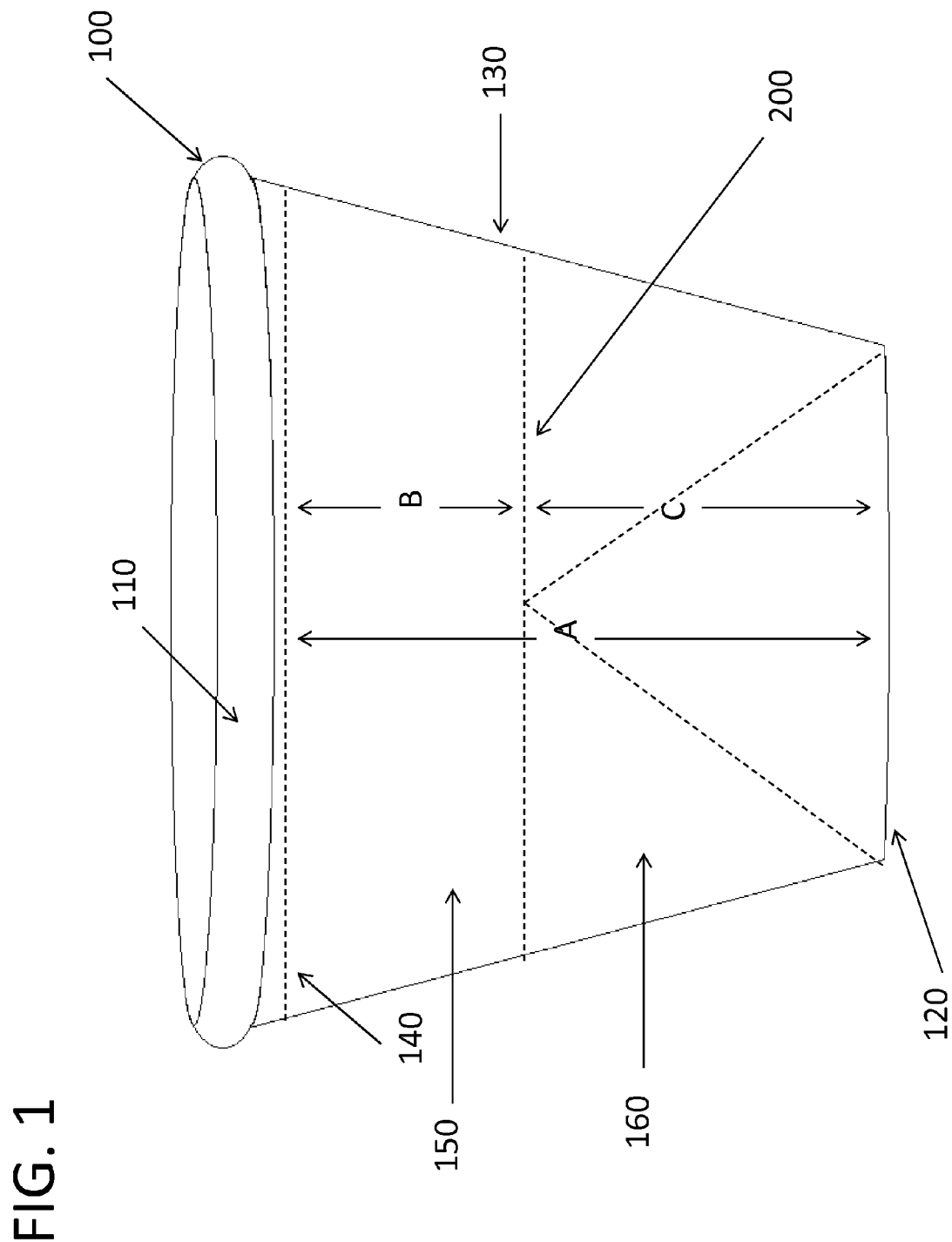
FIG. 1 presents a schematic view of a horticultural container comprising a horticultural device in accordance with aspects and embodiments of the present invention.

Aspects and embodiments of the present invention are directed towards devices, methods, and kits for horticulture. Aspects and embodiments of the present invention may be used for potting, watering, and feeding plants. In some embodiments, the devices, methods, and kits disclosed herein may advantageously be used with horticultural containers. As used herein, "horticultural container" refers to any vessel used to pot, contain, and/or grow a plant, including but not limited to traditional pots, urns, and planters, and such terms may be used interchangeably. In some embodiments, the devices, methods, and kits disclosed herein may provide benefits over using a horticultural container alone—for example, with respect to the amount of potting medium required for plant growth, and thus may advantageously reduce the weight of the combined plant and horticulture container. As used herein, "potting medium" refers to, and may be used interchangeably, with, any medium capable of sustaining plant life, including but not limited to soil, mulch, dirt, moss, and other materials. Aspects and embodiments of the present invention may additionally provide advantages when used with horticultural containers over the use of horticultural containers alone with respect to irrigating, watering, and feeding a potted plant.

In some embodiments, the devices, methods, and kits disclosed herein provide the advantages of reducing the amount of potting medium required to cultivate a plant. Planters and other horticultural containers are often selected based on aesthetics, and sometimes not to accommodate a certain soil depth. Many decorative planters have a depth in the range of from about 12 inches to 24 inches, wherein depth is defined by the vertical height of the container, as measured from the internal floor of the container to its top. For a plant to be visible in a planter from a sight line other than from directly above said planter, as is often desirable, the planter must be filled with a potting medium to about the top of the planter such that the growth of the plant burgeons to a height above the top of the container.

Typically, potted plants require less than about 10 inches of soil to grow, and most common plants, including annuals or perennials, require only about 5 inches to about 6 inches of soil to flourish. Thus when a plant is potted, generally more soil must be used to fill the horticultural container than is necessary for the plant to burgeon. The "soil overfill," the amount of soil required by the selected horticultural container in excess of the amount required by the plant, increases the cost of planting. The soil overfill also causes the horticultural container containing the soil to be heavy, and the container may, because of its weight, be difficult to move and relocate as desired. For example, a pot having a 24 inch depth filled with a depth of approximately 24 inches of dry soil may weigh upwards of about 50 lbs to even 70 lbs, depending on the container's total volume. Further, when the soil is allowed to absorb water provided to the plant, the weight of the soil, and thus the weight of the pot, increases.

Aspects and embodiments of the present invention are directed to horticultural devices for use in horticultural containers that may eliminate soil overfill, reduce the cost of potting, and reduced the weight of soil required for potting, thus increasing the ease with which a plant potted in a horticultural container may be moved. Aspects and embodiments of the horticultural devices disclosed herein may also be used in methods of potting plants, horticultural kits to facilitate plant growth, and other horticultural applications.

In accordance with aspects and embodiments of the present invention and referring to FIG. 1, horticultural container 100 contains horticultural device 200. Horticultural container 100 has top rim 110, bottom 120, and wall 130. In order for a plant potted in container 100 to burgeon above top 110, container 100 must be filled with soil approximately to soil line 140. Device 200 comprises a supporting plate buttressed by a base in contact with bottom 120. The supporting plate of device 200 is positioned in container 100 and configured to abut the internal sides of wall 130. In other embodiments, device 200 may comprise a supporting plate that is self-buttressing about the internal sides of wall 130. The supporting plate of device 200 defines a space 150 within horticultural container 100 above the supporting plate, and further defines a space 160 within horticultural container 100. In order for a plant potted in horticultural container 100 containing device 200 to burgeon above container top 110, only a portion of space 150— namely, the space between the supporting plate of device 200 and soil line 140—needs to be filled with soil. Space 160 does not need to be filled with soil. Horticultural device 200 may thus be positioned within container 100 to define a space capable of accommodating enough soil for a plant potted in container 100 containing device 200 to flourish while simultaneously eliminating undesirable soil overfill. Without device 200, horticultural container 100 would need to be filled with a depth of soil represented by line A. With horticultural device 200, container 100 need only be filled with a depth of soil represented by line B. Line C represents the difference between lines A and lines B and is equal to the depth of soil overflow that would be required to fill container 100, absent the benefit of device 200.

Figure 2:
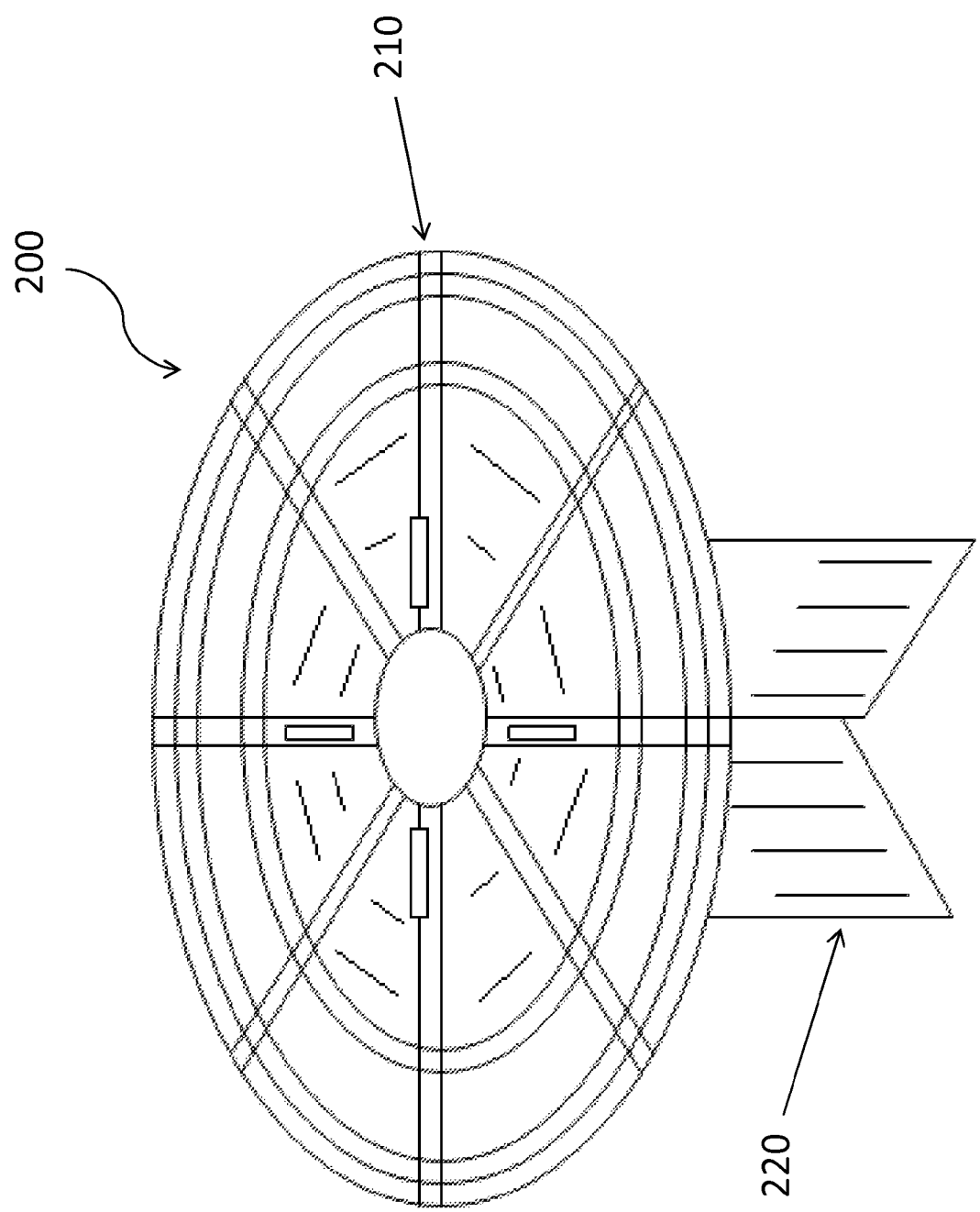
FIG. 2 presents a perspective view of a horticultural device in accordance with aspects and embodiments of the present invention.

In accordance with some embodiments and referring to FIG. 2, device 200 comprises supporting plate 210 and base 220. Supporting plate 210 may have any shape and may be adjusted to accommodate horticultural containers of varying geometries. As shown in FIG. 2, supporting plate 210 has a circular geometry; however, it may be oval, oblong, square, rectangular, or may be any other shape. Supporting plate 210 may also be capable of adjustment, for example, by trimming excess material from supporting plate 210 to accommodate a horticultural container of any geometry. Base 220 is coupled perpendicularly to supporting plate 210 and may likewise be of any suitable geometry and may also be capable of adjustment by, for example, trimming excess material from base 220. Base 220 and supporting plate 210 may be adjusted such that base 220 contacts the floor of a horticultural container and buttresses supporting plate 210 and potting medium placed thereupon, and may be adjusted such that supporting plate 210 abuts the internal walls of a horticultural container at a desired location: i.e., at a location positioned between the container floor and the container top that may provide enough soil depth for a plant potted in the container to flourish while simultaneously eliminating soil overfill.

In some embodiments, supporting plate 210 may have features that advantageously improve the structural integrity of device 200. In accordance with some embodiments and referring to FIG. 3, supporting plate 210 may have, for example, reinforcement undulations 10 molded in, on, or otherwise defined by supporting plate 210. Reinforcement undulations 10 may be positioned about the perimeter of supporting plate 210, and may in some embodiments, comprise concentric undulations that traverse a portion of, substantially all, or all of the surface area of supporting plate 210. For example, a circular supporting plate having a diameter of about 19 inches may have a plurality of concentric undulations traversing the supporting plate's surface. The outermost undulation may have a diameter substantially equal to the diameter of the plate, whereas the inner-most undulation may have a diameter less than the diameter of the plate. For example, the diameter of the inner-most undulation may be about 6 inches. Undulations may be positioned between the inner-most and outer-most undulations to form a plurality of concentric, reinforcement undulations.

Reinforcement undulations 10 may be raised or recessed with respect to the surface of supporting plate 210. In accordance with some embodiments, reinforcement undulations may be ridges raised above the surface of supporting plate 210, and may for example, be raised in range of from about 0.1 cm to about 1 cm above the surface of supporting plate 210. In accordance with some embodiments, reinforcement undulations may be reinforcement grooves recessed below the surface of supporting plate 210. Reinforcement grooves, may for example, be recessed in a range of from about 0.1 cm to about 1 cm below the surface of supporting plate 210. Reinforcement undulations 10 may comprise a plurality of both reinforcement ridges and grooves and said undulations may have a plurality of differing heights and depths with respect to the surface of supporting plate 210. Reinforcement undulations 10 may comprise a plurality of widths and the widths of reinforcement undulations 10 may differ within a single supporting plate. For example, reinforcement undulations on supporting plate 210 may have multiple and differing widths in a range of from about 0.1 cm to about 1 cm. In some embodiments, a single supporting plate 210 may comprise grooves and ridges, and the grooves may have different widths than ridges or, a plurality of ridges and/or grooves may have a plurality of differing widths. In accordance with some embodiments, reinforcement ridges and grooves may be positioned in contact with one another. For example, a reinforcement ridge may be positioned in contact with and between two reinforcement grooves.

Supporting plate 210 may have a reinforcement hub 30 molded in, on, or otherwise defined by supporting plate 210. Reinforcement hub 30 may be a raised structure molded and/or positioned about the center of supporting plate 210. Hub 30 may have a geometry consistent with the geometry of supporting plate 210 or may, in some embodiments, have a geometry other than that of the supporting plate. Hub 30 may, for example, be a disc positioned about the center of a circular supporting plate 210 and raised in relation to the surface of the supporting plate. Hub 30 may be raised in relation to the surface of the supporting plate in a range of from about 0.1 cm to about 1 cm, and in some embodiments, about 0.5 cm.

In accordance with some embodiments, supporting plate 210 may have a plurality of reinforcement spokes 20 molded in, on, or otherwise defined by supporting plate 210. In some embodiments, reinforcement spokes 20 may extend from hub 30. Reinforcement spokes 20 may be raised with respect to the surface of supporting plate 210 and may, for example, be raised in a range from about 0.1 cm to 1 cm above the surface of supporting plate 210, and in some embodiments, support spokes 20 may be raised about 0.5 cm. Reinforcement spokes 20 may have a width in a range of from about 0.5 cm to about 2 cm, and in some embodiments, reinforcement spokes 20 may have a width of about 1.5 cm. Reinforcement spokes 20 may be positioned radially in pairs opposite one another to form reinforcement beams across a diameter of supporting plate 210 or, in some embodiments, they may be staggered. Reinforcement spokes 20 may terminate at hub 30, or, in some embodiments, may extend to the center of supporting plate 210. Spokes 20 may intersect undulations 10 or may, in some embodiments, be interested by undulations 10.

In accordance with some embodiments, supporting plate 210 may have horticultural features that advantageously benefit a plant potted thereon. Supporting plate 210 may have features that allow for the drainage of excess liquid, including excess water and excess liquid-contained food supplied to a plant potted in a potting medium upon supporting plate 210. Supporting plate 210 may further have features that beneficially allow for the aeration and irrigation of plant potted in a potting medium upon supporting plate 210. For example, in accordance with some embodiments and referring to FIG. 3, supporting plate 210 may have a plurality of apertures 40. Apertures 40 may beneficially assist the growth of a plant potted in a potting medium upon supporting plate 210 by facilitating the drainage of excess liquid supplied to the plant and/or potting medium and by facilitating the irrigation and aeration of a plant. Apertures 40 may be sized to accommodate both the draining of excess liquid and aeration while ensuring that potting medium does not fall into the space below supporting plate 210. Apertures 40 may be circular, oblong, square, rectangular, or any other geometry and may, in some embodiments, be slits. The slits may have a width of, for example, about 1/16 inches, and may have length in a range of from about 0.5 inches to about 2 inches, and in some embodiments, may be about 1 inch in length.

Figure 3:
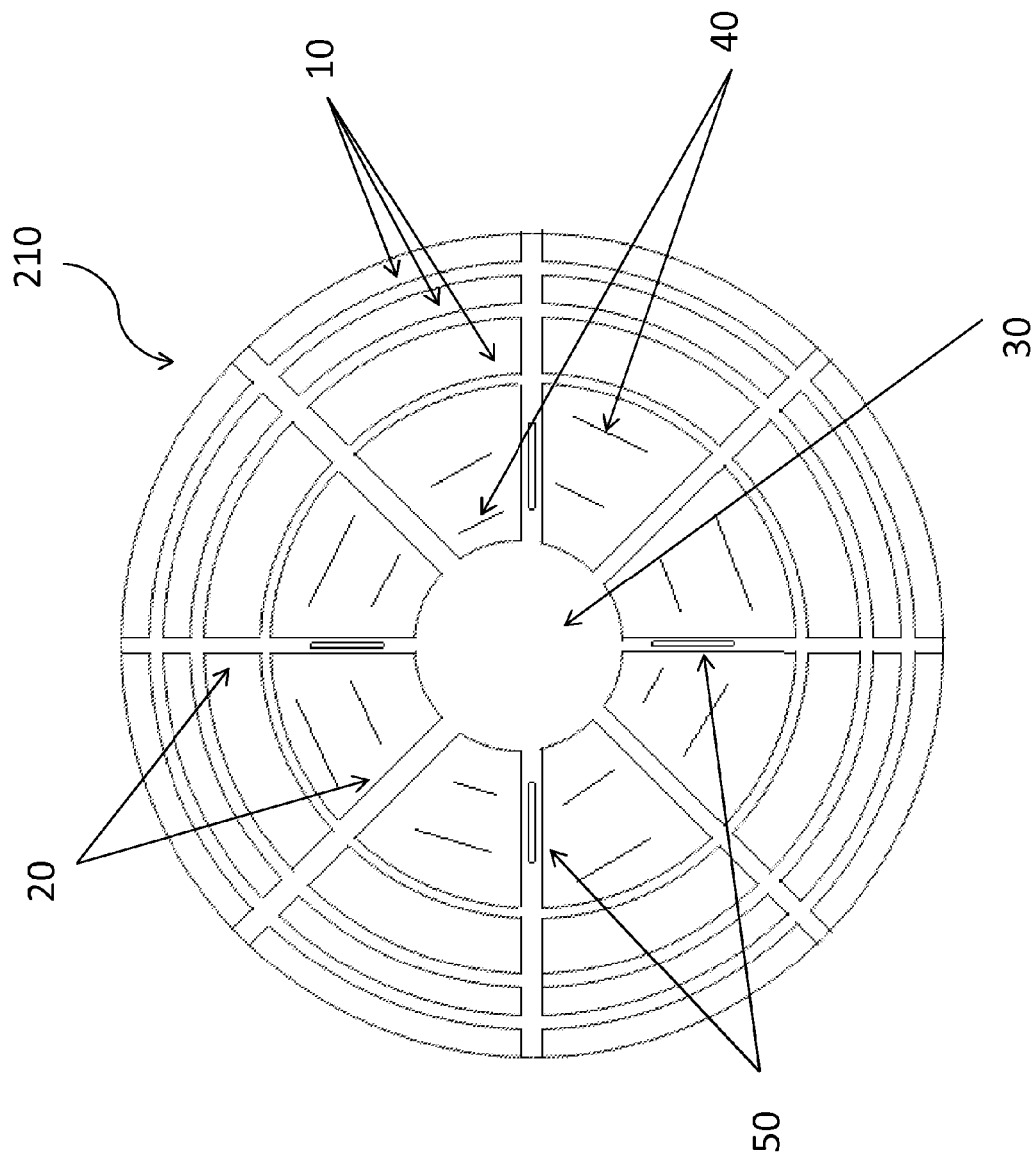
FIG. 3 presents a top plan view of a horticultural supporting plate of a horticultural device in accordance with aspects and embodiments of the present invention.

In accordance with some embodiments, supporting plate 210 may have a mating element designed to facilitate the coupling of base 220 to supporting plate 210. The mating element may comprise a female structure designed to cooperate with a complimentary male structure on base 220. Referring to FIG. 3, supporting plate 210 includes coupling slots 50. Slots 50 may be positioned at any appropriate location on supporting plate 210, and may, in some embodiments, be positioned on reinforcement spokes 20. Slots 50 may receive a corresponding portion of base 220 to couple supporting plate 210 perpendicularly to base 220.

In accordance with some embodiments, base 220 may comprise a plurality of leg members that interlock to form a structure sufficient to buttress supporting plate 210. Leg members may, in accordance with some embodiments, be planar or substantially planar, but may, in other embodiments comprise one or more angles or folds that facilitate buttressing. In accordance with some embodiments and referring to FIGS. 4 and 5, base 220 may comprise a plurality of planar leg members 60A and 60B. Base 220 having leg members 60A and 60B may advantageously be packaged in an unassembled state with supporting plate 210 to provide an unassembled horticultural device 200 in a substantially planar package. Base 220 may subsequently be assembled and coupled to supporting plate 210 by, for example, a mating feature. Referring again to FIGS. 4 and 5, base 220 may comprise coupling tabs 80. Coupling tabs 80 may be received by a complimentary element defined by supporting plate 210. Referring also to FIG. 3, coupling tabs 80 may be received by coupling slots 50 on supporting plate 210 to couple base 220 to supporting plate 210. Slots 50 and tabs 80 may, in some embodiments, have corresponding structures that further lock base 220 to supporting plate 210. Coupling tabs 80 and coupling slots 50 may be constructed, positioned, and arranged to couple supporting plate 210 perpendicularly to base 220.

Figure 4:
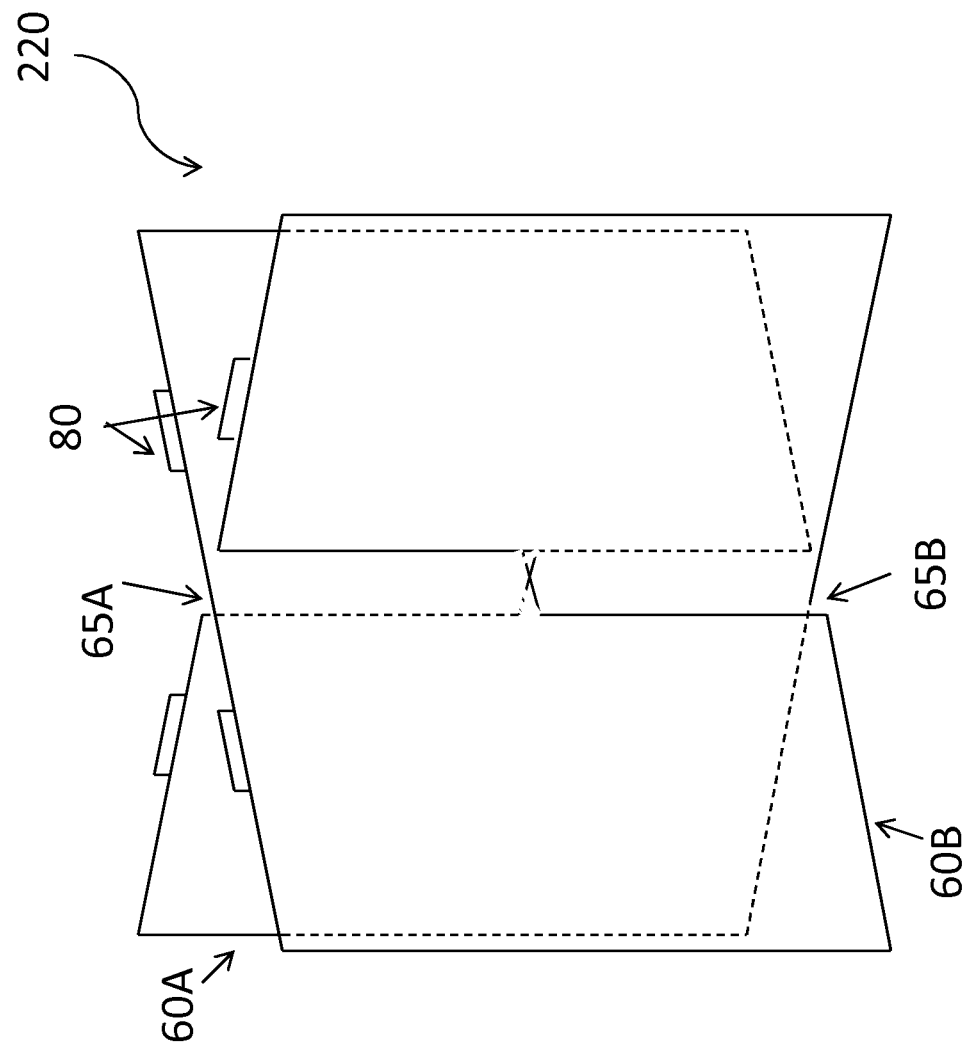
FIG. 4 presents a perspective view of a horticultural base of a horticultural device in accordance with aspects and embodiments of the present invention.
Figure 5:
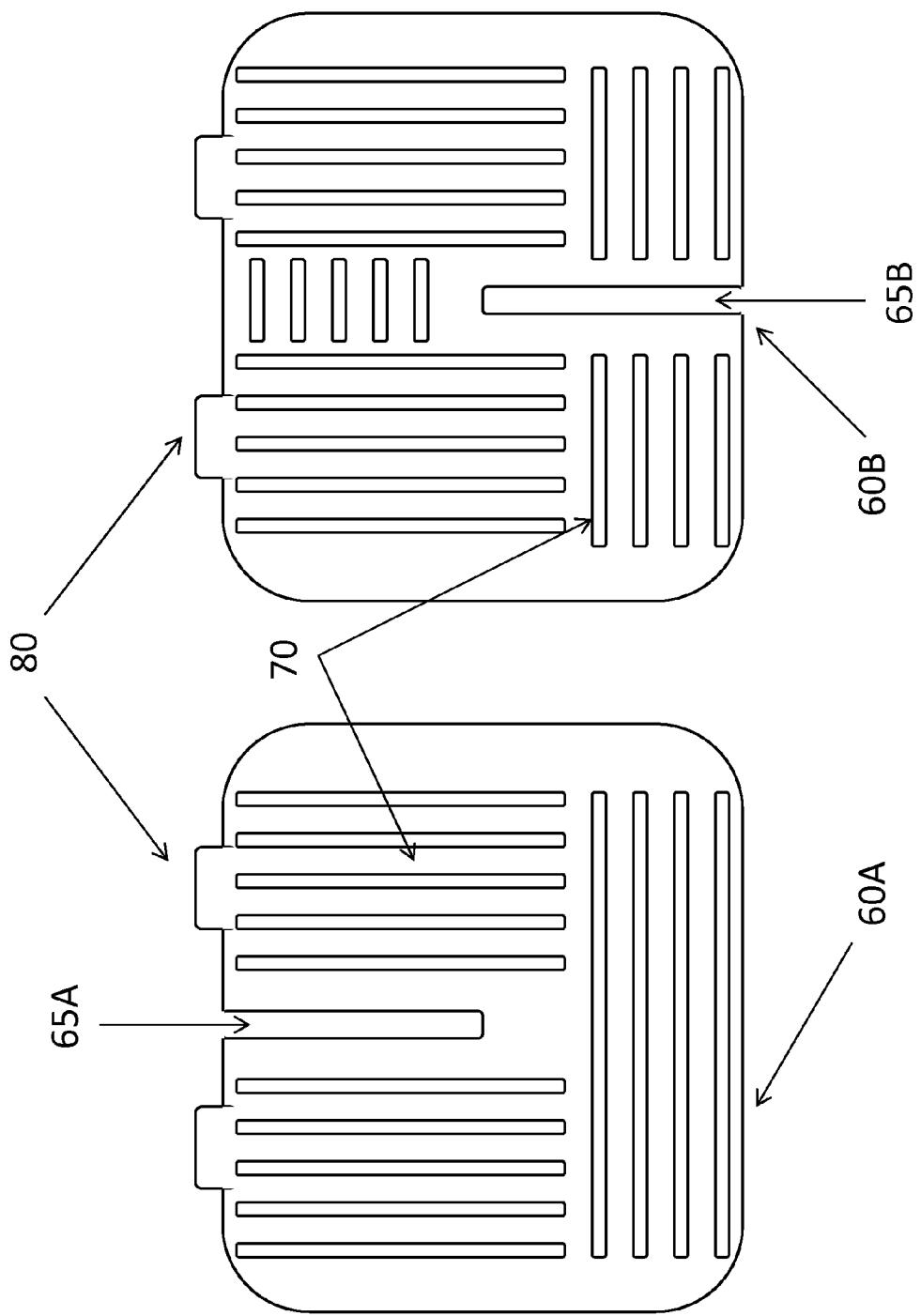
FIG. 5 presents an elevational view of leg members that interact to form a base of a horticultural device in accordance with aspects and embodiments of the present invention.

In accordance with some embodiments and referring to FIG. 4, base 220 comprises two leg members 60A and 60B, each of which has a top, supporting edge, defined by two coupling tabs 80 that are positioned on opposite sides of the midline of leg members 60A and 60B. Member 60A includes interlock cavity 65A that bisects tabs 80. Cavity 65A extends from about the center of leg member 60A and along the member's midline to the top of member 60A. Member 60B has interlock cavity 65B that extends from about the center of member 60B and along the member's midline to the bottom of member 60B. Interlock cavities 65A and 65B may be sized to accommodate a complementarily leg member, and may, in some embodiments, have a feature capable of locking in place a second leg member to form a base capable of buttressing supporting plate 210 and a potting medium placed thereupon. Referring to FIG. 5, leg members 60A and 60B may be interlocked via interlocking cavities 65A and 65B to form assembled base 220. Leg member 60B having cavity 65B may be interlocked with plate 60A via cavity 65A by causing members 60A and 60B to be received respectively by cavities 65B and 65A.

In accordance with some embodiments, leg members 60A and 60B, and base 220, may comprise reinforcement features that advantageously improve the structural integrity of base 220 and its ability to buttress supporting plate 210 and a potting medium placed thereupon, and thus may improve the overall structural integrity of device 200. A reinforcement feature may be a singular reinforcement feature such as an additional base piece capable of providing additional support, for example a foot piece, or may, in some embodiments, be one, or a plurality of, structural elements molded into, on to, or coupled to the leg members and/or base. Referring to FIG. 4, leg members 60A and 60B may have a plurality of reinforcement ribs 70. Reinforcement ribs 70 may be raised or recessed with respect to the surface of a leg member, and may, in some embodiments, be raised in a range of from about 0.1 cm to about 0.5 cm above the member's surface. Reinforcement ribs may have a width in a range of from about 0.1 cm to about 0.5 cm. A leg member may comprise reinforcement ribs 70 having a variety of differently sized ribs, with respect to raise or recess, and width, and other characteristics. Ribs 70 may extend across the entire length of a leg member, the entire height of a leg member, or any portion thereof. In some embodiments, reinforcement ribs 70 may run both vertically and horizontally across the leg member, or at angles therebetween. Referring to FIG. 5, leg members 60A and 60B have multiple sets of linear, parallel ribs that run both horizontally and vertically across the surface of the leg members. Though ribs 70 are shown as linear and parallel, and horizontal and vertical sets are shown as perpendicular to one another, ribs 70 may comprise angular ribs, ribs may intersect or diverge from one another, and one or a plurality of ribs may be positioned with respect to one another at acute or obtuse angles.

Figure 6:
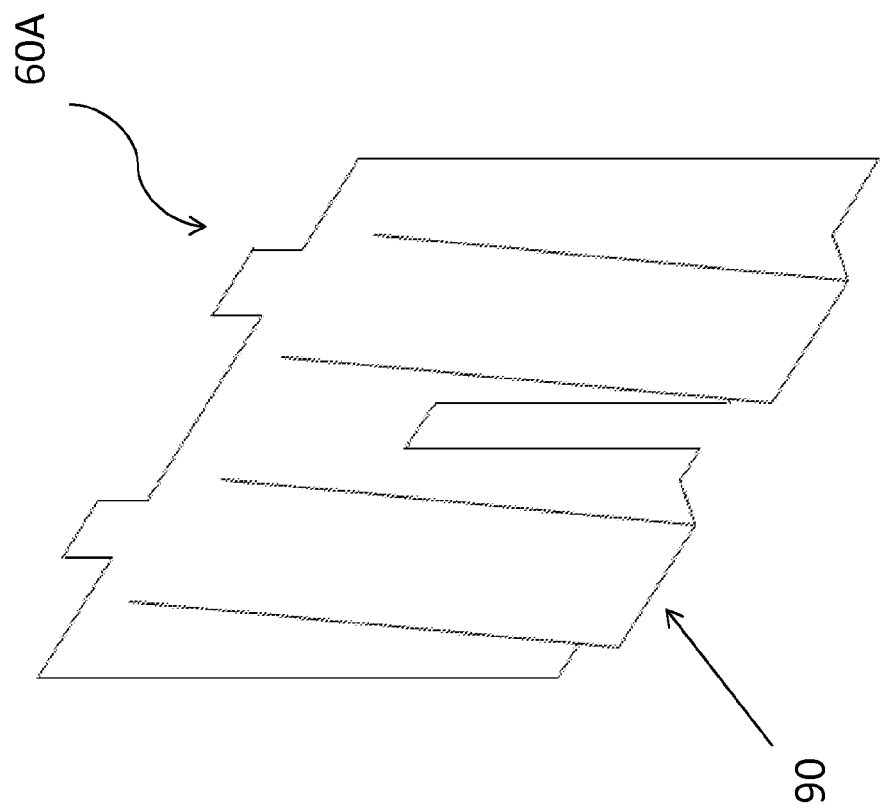
FIG. 6 presents a perspective view of an alternative embodiment of a leg member in accordance with aspects and embodiments of the present invention.

In accordance with some embodiments, leg members may comprise one or more reinforcement feet. Referring to FIG. 6, leg member 60A has two reinforcement feet 90 positioned on opposite sides of the midline of leg member 60A. Reinforcement feet 90 may advantageously increase the foot print of a horticultural base 220 and improve the overall structural integrity of device 200. Reinforcement feet 90 may be constructed and arranged such that an unassembled horticulture device comprising leg members with reinforcement feet 90 may be provided in a substantially planar package.

Figure 7:
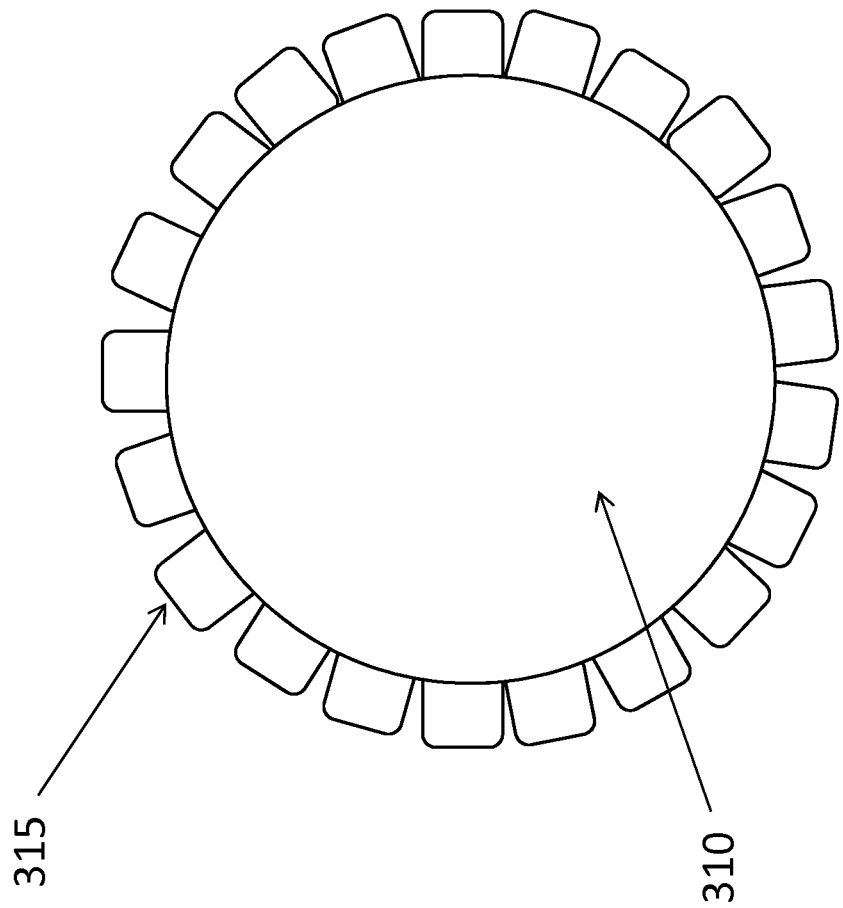
FIG. 7 presents top plan view of an alternative embodiment of a horticultural device in accordance with aspects and embodiments of the present invention.

In accordance with some embodiments, the supporting plate of device 200 may be self-buttressing. Device 200 may comprise a supporting plate 310. Supporting plate 310 may have any shape and may be shaped to accommodate horticultural containers of varying geometries. As shown in FIG. 7, supporting plate 710 has a circular geometry; however, it may be oval, oblong, square, rectangular, or may be any other shape. Supporting plate 310 has buttressing petals 315.

Buttressing petals 315 surround the perimeter of supporting plate 310 and may be about 1 inch to about 3 inches long, and may, in some embodiments, be about 2.5 inches long. Petals 315 may be spaced around the perimeter of supporting plate 310 and may, in accordance with some embodiments, be spaced about 1/16 of an inch apart from one another. The diameter of supporting plate 310 may be any size, and may, in accordance with some embodiments, be sized to fit a pot having a diameter of about 12 inches to about 20 inches. Supporting plate 310 may for example have a diameter of about 10 inches, and, including buttressing petals 315, may have a total diameter of about 15 inches. Supporting plate 310 and buttressing petals 315 may have other sizes and geometries to accommodate pots having other sizes and geometries.

Figure 8:
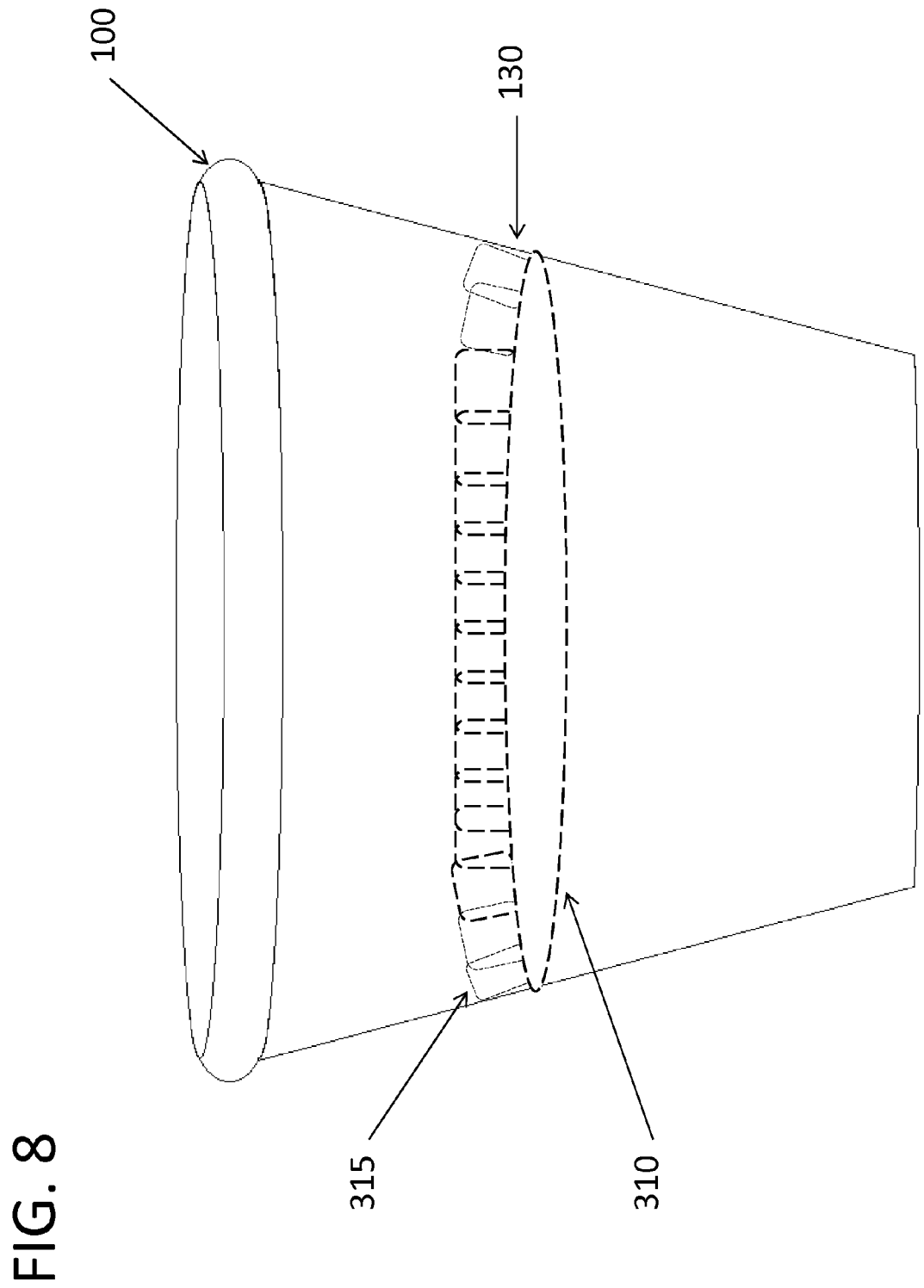
FIG. 8 presents a presents a perspective view of an alternative embodiment of a horticultural device in accordance with aspects and embodiments of the present invention.
Figure 9:
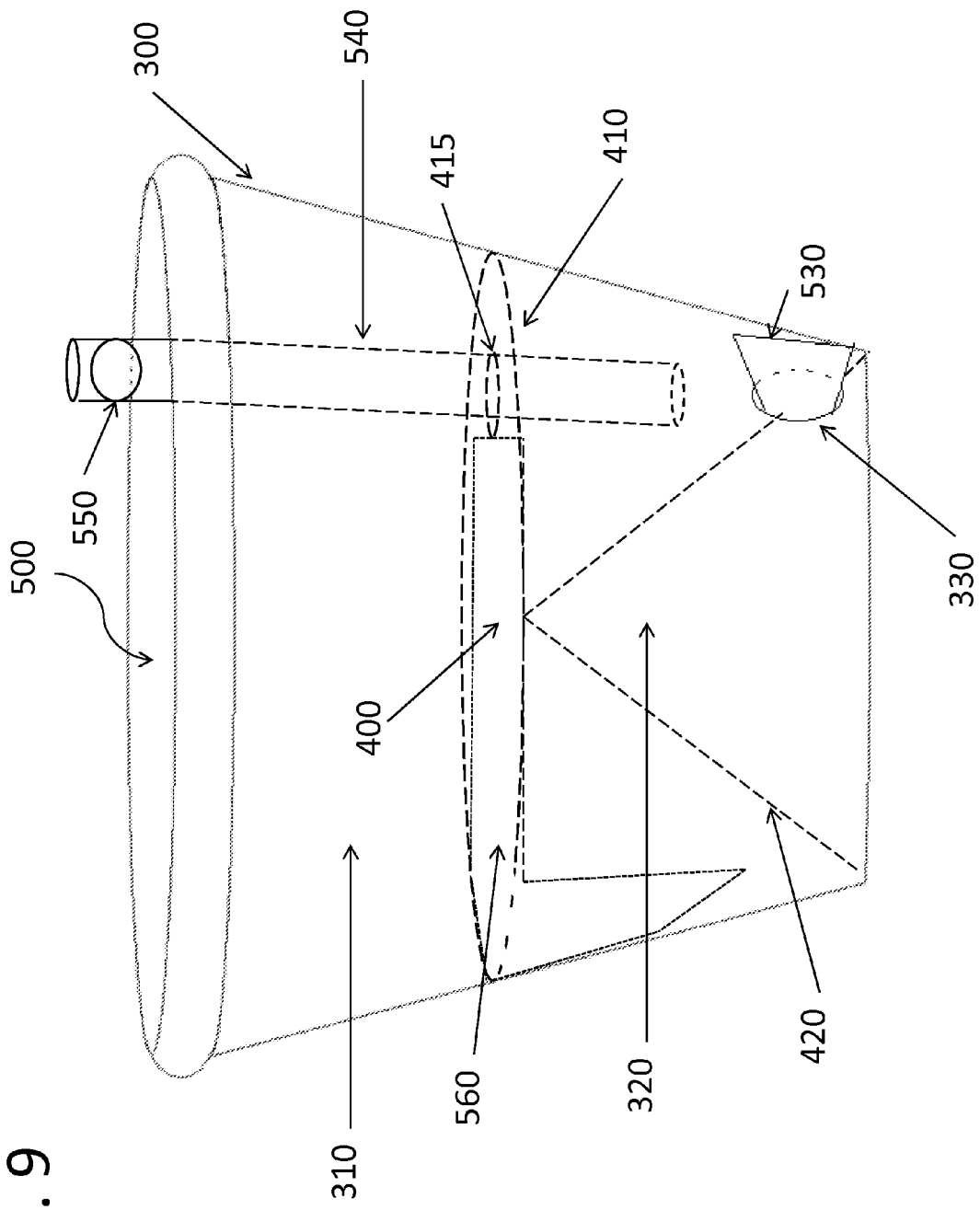
FIG. 9 presents a schematic view of a horticultural container comprising a horticultural kit in accordance with aspects and embodiments of the present invention.

Petals 315 may be made of a flexible material, and in some embodiments, may be an elastomeric material such as rubber or a blend of plastic and rubber. Petals 315 may bend to accommodate a variety of horticultural containers. Referring also to FIG. 8, when supporting plate 310 having buttressing petals 315 is placed in horticultural container 100, petals 315 bend upward along the internal sides of wall 130 to buttress supporting plate 310 within container 100. Petals 315 also overlap one another to create a seal between supporting plate 310 and the internal sides of wall 130 to prevent soil from slipping below supporting plate 310. Potting medium placed in container 100 will exert a downward force on supporting plate 310, however, the diameter of supporting plate 310 and buttressing petals 315 prevent device 200 from being downwardly displaced beyond a desirable level in container 100.

In accordance with an aspect of the present invention, a horticultural device may be advantageously used in a method to facilitate horticultural potting. In accordance with some embodiments of a method of facilitating horticultural potting, a horticultural device may be provided. The device may include a planar supporting plate and at least two planar or substantially planar leg members in an unassembled state. In the alternative, the device may include a single planar supporting plate having buttressing petals. The device may be provided in a single, substantially planar package. The planar packaging of the device may beneficially reduce shipping costs of the device as compared to an assembled and/or non-planar device, and may beneficially occupy less shelf space then an assembled and/or non-planar packaged device when being offered to for sale.

In accordance with some embodiments, a method of facilitating horticultural potting may comprise assembling an unassembled horticultural device. A horticultural device in accordance with aspects and embodiments of the present invention may be provided with instructions to assemble the device. The instructions may, for example, instruct the construction of the base of the device by interlocking at least two leg members. The instructions may further instruct the coupling of the supporting plate to the leg members, by for example, inserting coupling tabs positioned on the leg members, and thus the assembled base, into coupling slots located on the provided supporting plate. Further instructions may be provide directions to place the assembled device into a horticultural container of the user's choice. In accordance with other embodiments, a method of facilitating horticultural potting may comprise fitting a supporting plate having buttressing petals in a horticultural container.

The device may, in accordance with embodiments, define a space within the container and above the supporting plate. The user may then be instructed to fill the defined space above the supporting plate with a potting medium to enable the potting of a plant. The resultant container including the device and having a potting medium therein may advantageously weigh less than a like container not including horticultural device and sufficiently filled with a potting medium. Further, less potting medium may be required in the container including the device than in a container of equal size absent the device, which may reduce the cost associated with horticultural potting.

The supporting plate, including supporting plates having petals, leg members, and/or the assembled base, and the assembled device may comprise one or more reinforcement features that improve the structural integrity of the device. The supporting plate, base, and/or leg members may, in some embodiments, include structural elements molded in to, on to, or coupled to the supporting plate, base, and/or leg members.

In accordance with some embodiments, the reinforcement features may include reinforcement undulations, reinforcement ribs, reinforcement spokes, a reinforcement hub, reinforcement feet, or other structural elements molded into the supporting plate, leg members, base, and/or device. In addition to improving the structural integrity of the horticultural device, the reinforcement features may advantageously facilitate adjustment of the supporting plate, leg members, base, and/or device by a user.

In accordance with some embodiments, a method of facilitating horticultural potting may additionally instruct adjustment of the device by a user to accommodate horticultural containers of a variety of geometries. A user may be instructed to adjust the supporting plate, leg members, base, and/or device in order to facilitate the device's use in a desired container. A user may, for example, be instructed to trim excess material from the supporting plate, leg members, base, and/or device using shears. The shears may be any standard utility shears, including but not limited to kitchen scissors and craft scissors. A user may be instructed to trim excess material from the supporting, leg members, base, and/or device by using a reinforcement feature as a cutting guide. A reinforcement feature may thus act as a guide to facilitate adjust of the device by enabling a user to removing an appropriate, pre-measured, amount of excess material from the supporting plate, leg members, base, and/or device. In accordance with other embodiments, a user may instead remove an amount of material not in accordance with a reinforcement feature guide to accommodate the geometry of a horticultural container not consistent with the reinforcement features/guides provided. When a supporting plate having buttressing petals is used, the petals bend to accommodate the horticultural container and no material need be removed from the device. The flexible nature of the petals allows the supporting plate to accommodate a variety of horticultural containers.

In accordance with aspects and embodiments, the horticultural devices of the present invention may be made from any suitable material. The supporting plate, leg members, base, and/or device may be constructed of metals, woods, cardboards, rubbers, composite materials, plastics, and any other medium capable of fabricating a horticultural device in accordance with the aspects and embodiments disclosed herein. The supporting plate, leg members, and/or base may be fabricated from the same material, or in some embodiments, the supporting plate may be fabricated from a material different than the material employed to fabricate the buttressing petals, leg members and/or base. Still, in accordance with other embodiments, the supporting plate, leg members, base, and/or device may be fabricated from a plurality of materials. For example, the supporting plate may be fabricated from both plastic and another material, such as rubber. In accordance with some embodiments, a supporting plate and leg members may be fabricated from the same general type of material, but the properties of the material used to fabricate the supporting plate may differ from the properties of the material used to fabricate the base. For example and in accordance with some embodiments, polystyrene may be used to fabricate both the supporting plate and leg members. The leg members may be fabricated by molding one gauge of polystyrene, for example, 48 gauge, and a supporting plate for the horticultural device may be fabricated by molding a different gauge of polystyrene, for example, 38 gauge. In accordance with some embodiments, reinforcement features may be molded into a material, such as polystyrene, that may enable the device to perform adequately when constructed from a relatively thin gauge of polystyrene.

In some embodiments, reinforcement features molded into polystyrene may enable the horticultural device to be fabricated from a thin gauge of polystyrene without sacrificing performance of the device. In some embodiments, reinforcement features may enable the use of a gauge of polystyrene that may not otherwise be capable of offering the same support characteristics of a horticultural device without such reinforcement features. In accordance with some embodiments, reinforcement features may enable the device to be fabricated from polystyrene having a gauge of 43 or less.

In some embodiments, the horticulture devices of the present invention may be fabricated by an injection molding process. For example and with particular reference to a supporting plate having buttressing petals, the supporting plate having petals may be fabricated by an injection molding process whereby a plastic and rubber blend is injected into a mold. The supporting plate may have a thickness that is substantially greater than the thickness of the petals such that the petals bend easily while the plate remains rigid. Reinforcement features may be incorporated into the mold to enhance the structural integrity of the resulting supporting plate.

In accordance with some embodiments, the injection molding process may comprise a plurality of steps. For example, the supporting plate may be formed by a first injection molding process using a first material, and the buttressing petals may be formed in a second injection molding process using a second material.

In accordance with aspects and embodiments of the present invention, a kit for horticultural containers may advantageously facilitate growth and reduce maintenance of a potted plant. Referring to FIG. 7, horticultural container 300 contains kit 500 in assembled form. Kit 500 comprises horticultural device 400. Horticultural device 400 comprises supporting plate 410 and base 420. Horticultural device 400 defines spaces 310 and 320 within horticultural container 300. More specifically, horticultural device 400 defines space 310 above supporting plate 410 and defines space 320 below supporting plate 410. Supporting plate 410 further includes inlet 415. Inlet 415 is an opening defined by supporting plate 410 sized to accommodate tubing of a given cross-sectional area, wherein the cross-sectional area of the tubing is defined by the diameter of the outer surface of the tubing.

In accordance with some embodiments, horticultural kit 500 comprises feed tubing 540. Feed tubing 540 may have a cross-sectional area that is less than the cross-sectional area of inlet 415 such that tubing 540 may be thread through inlet 415. Feed tubing 540 may extend from a position above or within space 310 to a position in space 320. Liquid, such as water, liquid plant nutrients, or water containing plant nutrients, may be introduced into tubing 540 via the end of tubing 540 positioned in or above space 310. Liquid received by tubing 540 may be introduced to space 320 via feed tubing 540. Feed tubing 540 may thus allow liquid to be introduced into space 320 even after space 310 has been filled with a potting medium.

In accordance with some embodiments, a horticultural container 300 may comprise a drain 330. Horticultural kit 500 may comprise stopper 530. Stopper 530 may be sized to block drain 330 such that any liquid introduced into space 320 by feed tubing 540 remains in space 320 and does not exit through drain 330.

Kit 500 may further comprise float 550. Float 550 may be a buoyant marker positioned within feed tubing 540. Float 550 may occupy a position within feed tubing 540 determined by the amount of liquid present in space 320. When the liquid level in space 320 reaches a maximum, which may be, for example, when the liquid contacts the bottom of supporting plate 410, float 550 may occupy a position at the top of feed tubing 540, thus indicating that the liquid level within space 320 is at its maximum. When the liquid level within space 320 is below the maximum, float 550 may occupy a position substantially below, and in relation to, the depressed liquid level in space 320. Feed tubing 540 may, in some embodiments, have indicia printed thereon, such that the position of float 550 may further provide information regarding the liquid level in space 320. Float 550 may thus indicate the liquid level within space 320.

In accordance with some embodiments, kit 500 may comprise capillary mat 560. Capillary mat 560 may be any material capable of wicking moisture from a source of liquid and releasing said wicked moisture into a potting medium when the potting medium is contacted with it. Capillary mat 560 may be constructed, sized, and arranged to cover at least a portion of supporting plate 410 and extend into space 320. Capillary mat 560 may thus wick up liquid contained in space 320. Capillary mat 560 may then transfer wicked liquid to a potting medium occupying at least a portion of space 310 and in contact with capillary mat 560. Capillary mat 560 may advantageously supply only the amount of liquid, for example water or food, required by a plant potted in a potting medium. Kit 500 may thus prevent over-watering of a plant potted in a container 300 comprising kit 500. Kit 500 may further reduce the maintenance associated with potting and/or growing a plant potted in container 300 by eliminating the need for daily watering and regular feeding. Float 550 may advantageously indicate to a user when a liquid level is low in space 320 of horticultural container 300, and a user may refill space 320 with water and/or liquid plant nutrients via conduit 540 as needed. Float 550 may also indicate when too much liquid is present and indicate to a user to remove stopper 530 to allow excess liquid to drain from the container.

Figure 10:
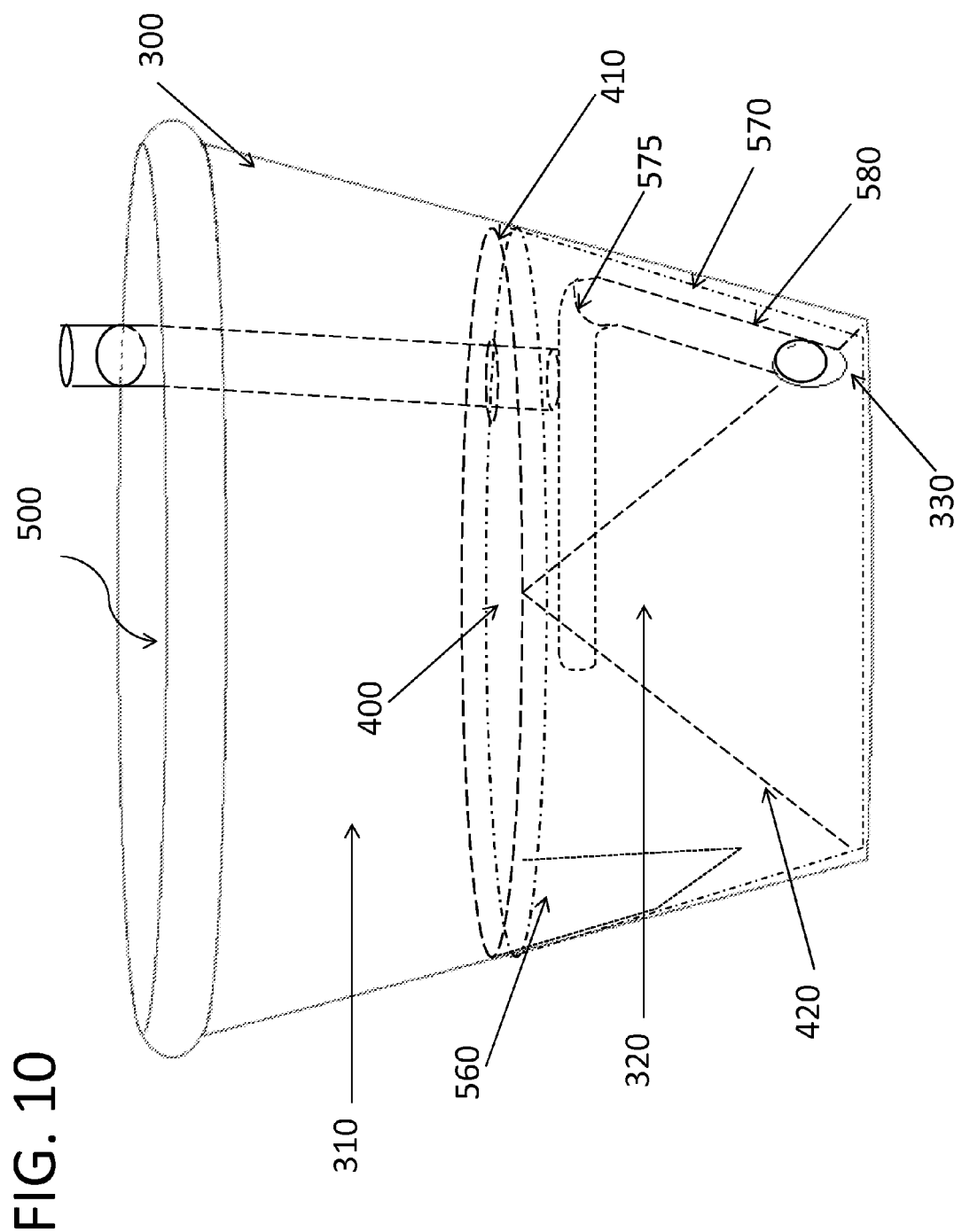
FIG. 10 presents a schematic view of a horticultural container comprising an alternative embodiment of a horticultural kit in accordance with aspects and embodiments of the present invention.

Horticultural containers are generally constructed of porous materials. In some embodiments, kit 500 may comprise a liner to line at least a portion of container 300 to prevent liquid from absorbing into the walls of the horticulture container. For example and referring to FIG. 10, waterproof lining 570 may be placed inside horticultural container 300. Lining 570 is preferably positioned inside container 300 before horticultural device 400 is placed in container 300. Lining 570 may be any water resistant or waterproof material, such as thin plastic, that conforms to the shape of container 300. Lining 570 may be affixed to the internal walls of horticultural container 300. Lining 570 may, for example, self-adhere to the inner walls of container 300. Lining 570 may have an adhesive on an outer side, for example, a double-sided tape, that affixes lining 570 within container 300.

When device 400 having supporting plate 410 and base 420 is placed within horticultural container 300, device 400 creates space 310 and 320 within container 300. Space 320 is lined by lining 570. Lining 570 creates a well within space 320. Capillary mat 560 is positioned to cover at least a portion of supporting plate 410 and extends into the well in space 320 creating by lining 570. The well created by lining 570 may be filled with liquid and capillary mat 560 may advantageously supply only the amount of liquid required by a plant potted in a potting medium in space 310.

In accordance with some embodiments, kit 500 may provide an escape tube in place of a stopper. Still referring to FIG. 10, an escape tube may 580 may be provided in place of stopper 530 to prevent excess moisture from accumulating in space 310 of container 300. Lining 570 necessarily blocks liquid from escaping through drain 330. Escape tube 580 is positioned at or through drain 330 between container 300 and lining 570. Escape tube 580 runs upward along the inner wall of container 300 in space 320, between the inner wall of container 300 and lining 570. Escape tube 580 is inserted into a puncture hole 575 in lining 570 at a position below supporting plate 410 and at the top of base 420. Puncture hole 575 may be provided in lining 570, or a user may create puncture hole 575 by puncturing lining 570 during installation of kit 500.

Figure 11:
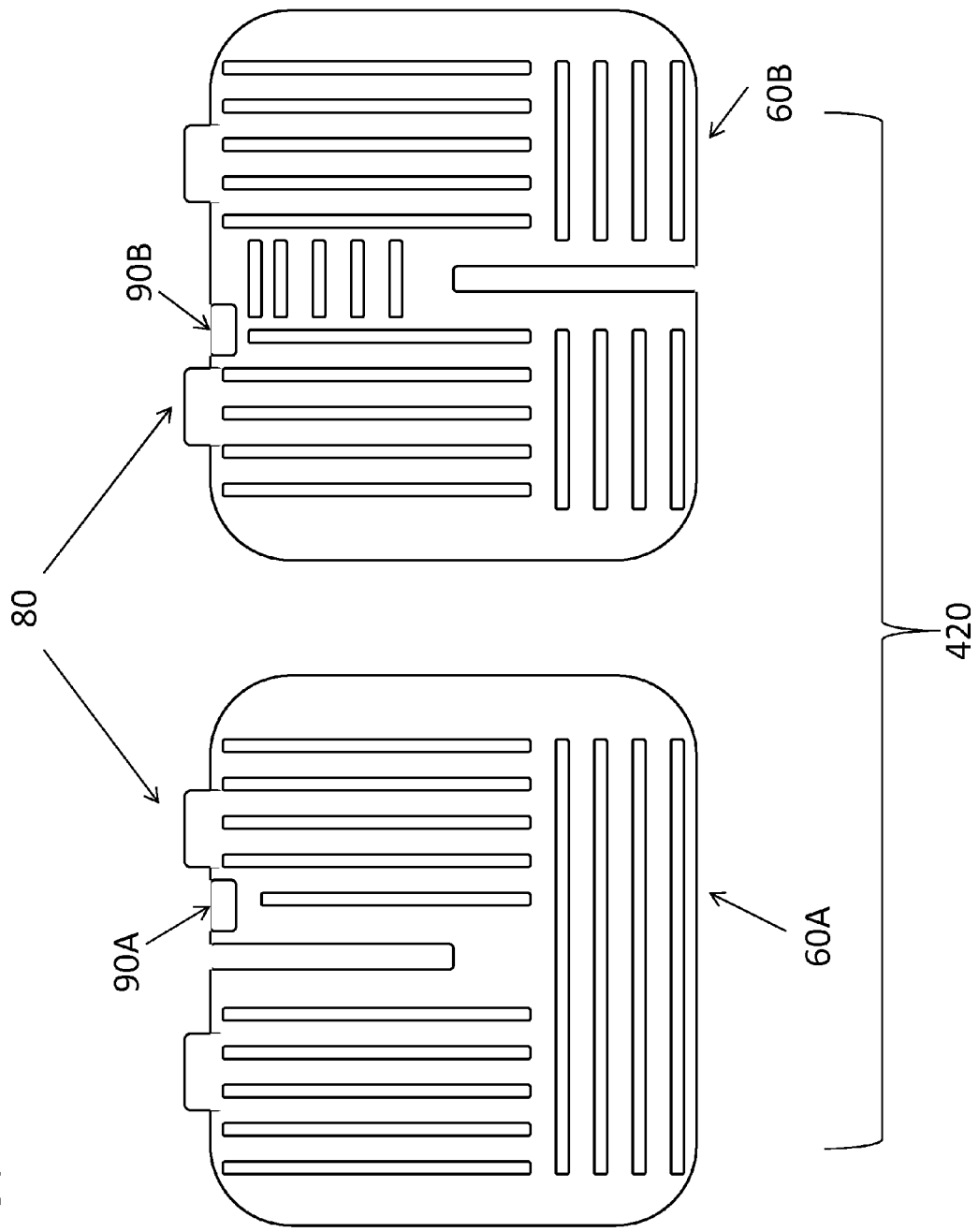
FIG. 11 presents an elevational view of an alternative embodiment of leg members that interact to form the base of a horticultural device in accordance with aspects and embodiments of the present invention.
Figure 12:
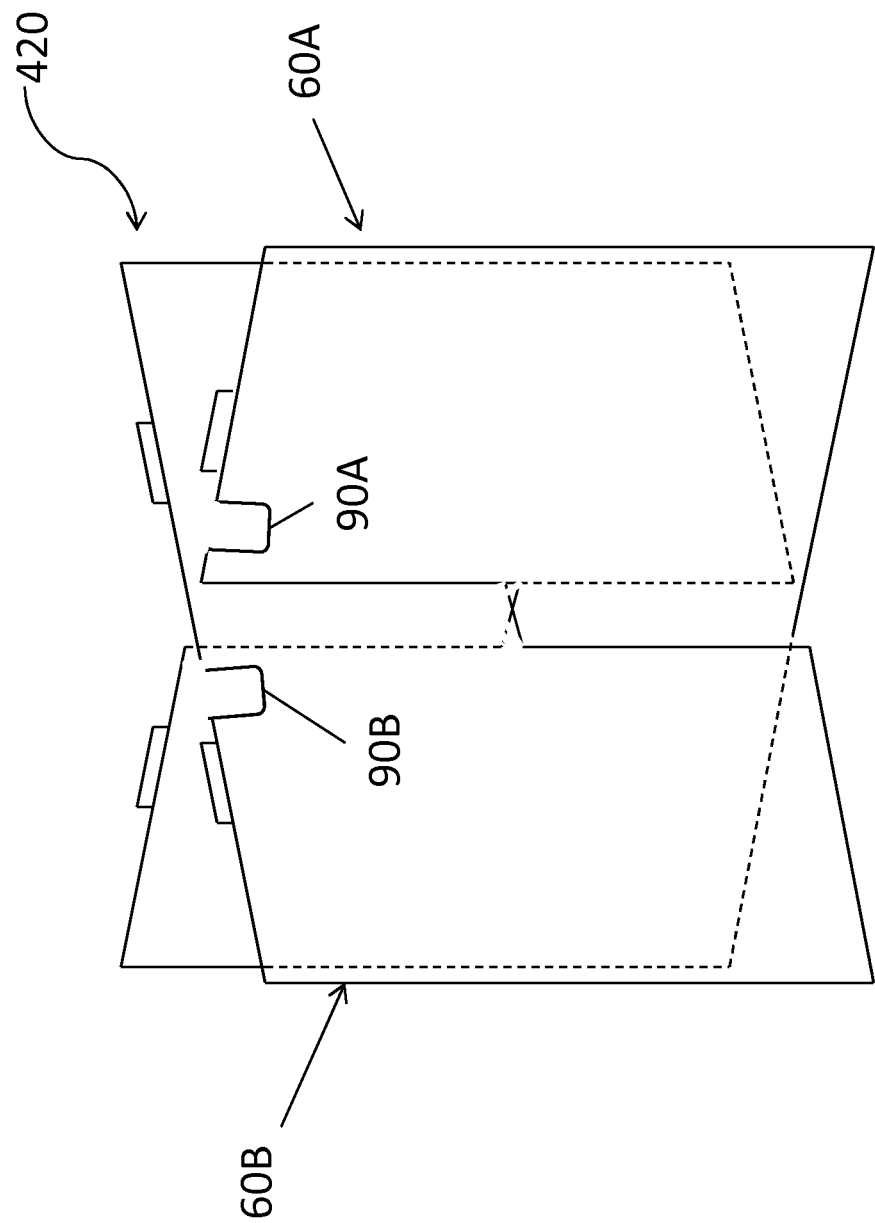
FIG. 12 presents a perspective view of an alternative embodiments of a horticultural base of a horticultural device in accordance with aspects and embodiments of the present invention.
Figure 13:
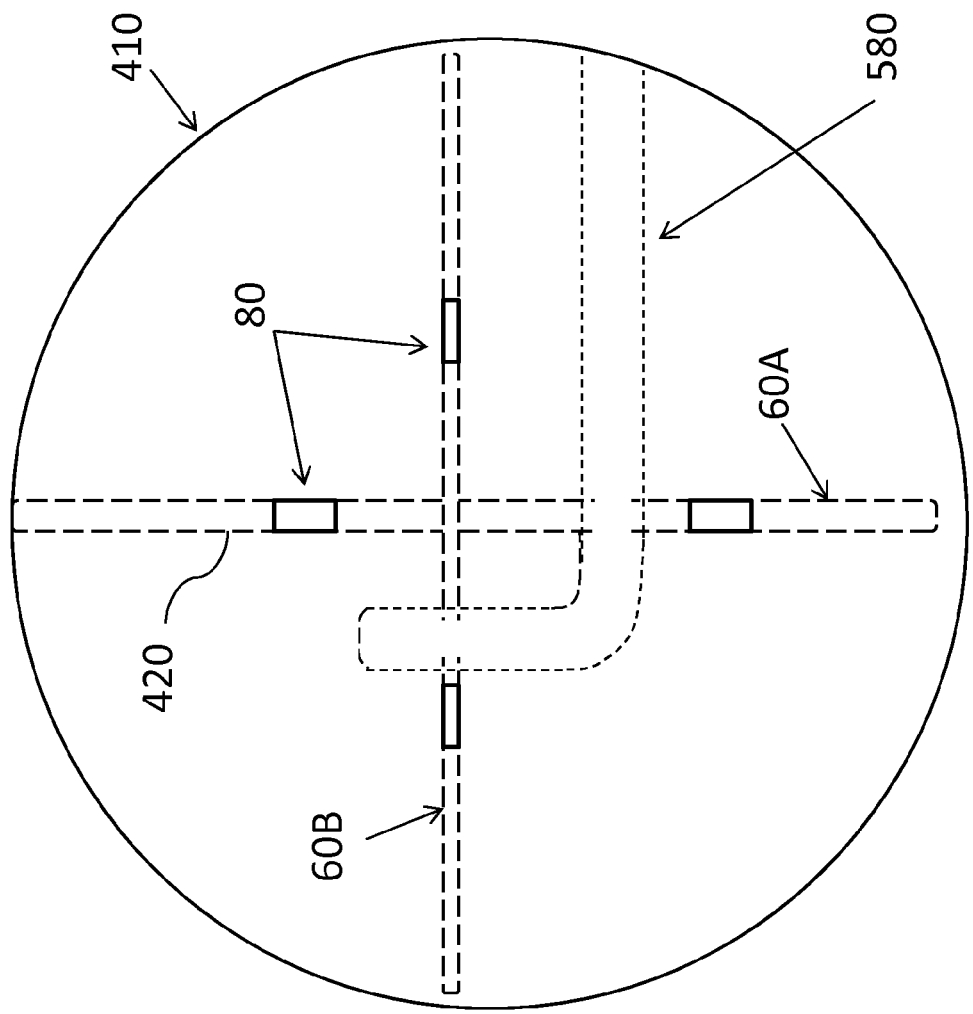
FIG. 13 presents a top plan view of a horticultural container comprising a horticultural kit in accordance with aspects and embodiments of the present invention.

Referring to FIG. 11, base 420 may comprise leg members 60A and 60B having grooves 90A and 90B, respectively. Grooves 90A and 90B may be positioned between coupling tabs 80. Referring also to FIGS. 12 and 13, when base 420 is assembled, grooves 90A and 90B may provide a channel to secure escape tube 580 at the top of base 420 under supporting plate 410.

Escape tube 580 is advantageously positioned directly below supporting plate 410. When the liquid level in the well created by lining 570 in space 320 reaches the level of escape tube 580, liquid flows out of the escape tube, through drain 330, and out of container 300. Thus any excess water in space 310, for example, rainwater, is automatically removed via escape tube 580.

It is to be appreciated that embodiments of the devices, methods and kits discussed herein are not limited in application to the details of construction and the arrangement of components as set forth in the above description or illustrated in the accompanying drawings. The devices, methods, and kits are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiment.

Also, the phraseology and terminology used herein is for the purpose of description and should not be regarded as limiting. Any references to embodiments or elements or acts of the apparatus and methods herein referred to in the singular may also embrace embodiments including a plurality of these elements, and any references in plural to any embodiment or element or act herein may also embrace embodiments including only a single element. The use herein of "including," "comprising," "having," "containing," "involving," and variations thereof is meant to encompass the items listed thereafter and equivalents thereof as well as additional items. Any references to positional or spatial orientation are intended for convenience of description, not to limit the present apparatus and methods or their components.

Having described above several aspects of at least one embodiment, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only.

What is claimed is:

1. A horticultural containment system, comprising:
a horticultural container including a floor and a wall; and
a horticultural device including
  a base for contacting the floor of the horticultural container, the base including at least two interlocking leg members, each leg member having a top supporting edge with at least one coupling tab formed on the top supporting edge, and
  a supporting plate constructed and adapted to abut the wall of the horticultural container and to rest upon said base, the supporting plate having a centrally located hub, at least one reinforcement undulation positioned concentrically about a perimeter of the supporting plate, a plurality of reinforcement spokes extending radially from the hub to the at least one reinforcement undulation, each of the plurality of reinforcement spokes is raised with respect to a surface of the supporting plate, and a plurality of coupling slots formed in the plurality of reinforcement spokes, each coupling slot being disposed completely within a boundary of the reinforcement spoke, the supporting plate being configured to be cut along the at least one reinforcement undulation to trim excess material from the supporting plate to accommodate a geometry of the horticultural container,
  wherein the coupling tabs of the at least two interlocking leg members are received in the coupling slots on the supporting plate to couple the base to the supporting plate.

2. The device of claim 1, further comprising a plurality of reinforcement undulations positioned concentrically about the perimeter of the supporting plate.

3. The device of claim 2, wherein at least one of the plurality of reinforcement undulations comprises a reinforcement ridge.

4. The device of claim 3, wherein at least one of the plurality of reinforcement undulations comprises a reinforcement groove.

5. A kit for a horticultural containment system, the kit comprising:
a horticultural device configured to define an upper space and a lower space in a horticultural container, the device having
  a supporting plate including a centrally located hub, at least one reinforcement undulation positioned concentrically about a perimeter of the supporting plate, a plurality of reinforcement spokes extending radially from the hub to the at least one reinforcement undulation, each of the plurality of reinforcement spokes is raised with respect to a surface of the supporting plate, and a plurality of coupling slots formed in the plurality of reinforcement spokes, each coupling slot being disposed completely within a boundary of the reinforcement spoke, the supporting plate being configured to be cut along the at least one reinforcement undulation to trim excess material from the supporting plate to accommodate a geometry of the horticultural container, the supporting plate further including an inlet, and
  a base coupled to the supporting plate, the base including at least two interlocking leg members, each leg member having a top supporting edge with at least one coupling tab formed on the top supporting edge,
  wherein the coupling tabs of the at least two interlocking leg members are received in the coupling slots on the supporting plate to couple the base to the supporting plate;
a feed tubing having an external cross sectional area less than a cross-sectional area of the inlet; and
a capillary mat configured to cover at least a portion of an upper surface of the supporting plate and further configured to extend into the lower space of the horticultural container defined by the horticultural device.

6. The kit of claim 5, wherein the feed tubing comprises a float configured to indicate the amount of water contained in lower space defined by the horticultural supporting plate.

* * * * *